United States Patent [19]
Sato

[11] Patent Number: 6,011,676
[45] Date of Patent: Jan. 4, 2000

[54] TAPE CASSETTE FOR MAGNETIC RECORDING

[75] Inventor: Taketoshi Sato, Miyagi, Japan

[73] Assignee: Sony Corporation, Tokyo, Japan

[21] Appl. No.: 08/994,651

[22] Filed: Dec. 19, 1997

[30] Foreign Application Priority Data

Dec. 27, 1996 [JP] Japan .................................. 8-350553

[51] Int. Cl.⁷ .............................................. G11B 23/08
[52] U.S. Cl. ........................................................ 360/132
[58] Field of Search ........................... 369/291; 360/132, 360/133

[56] References Cited

U.S. PATENT DOCUMENTS

| | | | |
|---|---|---|---|
| 4,486,320 | 12/1984 | Sakurai | 252/12.6 |
| 5,225,954 | 7/1993 | Kondo | 360/132 |
| 5,443,872 | 8/1995 | Akao et al. | 428/35.7 |

FOREIGN PATENT DOCUMENTS

| | | |
|---|---|---|
| 0372681 | 8/1989 | European Pat. Off. . |
| 57-208678 | 12/1982 | Japan . |
| 58-074751 | 5/1983 | Japan . |
| 59-231789 | 12/1984 | Japan . |
| 62-257951 | 11/1987 | Japan . |
| 02263856 | 10/1990 | Japan . |
| 5-109230 | 4/1993 | Japan . |
| 6-215519 | 8/1994 | Japan . |

*Primary Examiner*—William J. Klimowicz
*Attorney, Agent, or Firm*—Jay H. Maioli

[57] ABSTRACT

For preventing deterioration of magnetic characteristics of a magnetic tape in a tape cassette for magnetic recording and to maintain a stable traveling property of the magnetic tape the amount of a fatty acid contained in a lid portion (103) made of resin of a tape cassette (100) for magnetic recording is limited to a range from 1 to 100 ppm.

4 Claims, 3 Drawing Sheets

TAPE CASSETTE FOR MAGNETIC RECORDING

BACKGROUND OF THE INVENTION

The present invention relates to a tape cassette for magnetic recording including a magnetic recording medium comprising a metal thin film type magnetic recording medium and, more particularly, to a tape cassette for magnetic recording comprising a magnetic recording medium suitable for recording and reproducing a magnetic recording signal having a short wavelength (for high density magnetic recording) used, for example, as a tape for a high band 8 mm VTR, a digital VTR and so on.

A magnetic tape having a ferromagnetic metal thin film on a magnetic layer thereof has been put in practical use as a magnetic tape for a video tape recorder because it exhibits characteristics higher than those of a conventional coated type magnetic recording medium.

Further, it is expected to have a wide range of application such as application to a video recorder of higher quality such as a digital video recorder, to a digital tape recorder and soon in view of the future development of the field of a magnetic tape.

FIGS. 1 and 2 respectively show a perspective view and a schematic exploded view of a tape cassette for magnetic recording.

A tape cassette 100 for magnetic recording is formed of an upper shell 101 and a lower shell 102 which are combined such that they contain a pair of reels 200 around which a magnetic tape 120 is wound. In front of both shells 101 and 102, a lid portion 103, which comprises a font lid 103a and a back lid 103b in this example, is disposed to be freely opened and closed.

Each of the reels 200 comprises an upper flange 201, a lower flange 202, and a hub 203 provided at the center portion thereof around which the magnetic tape 120 is wound.

The tape cassette 100 for magnetic recording is configured such that the magnetic tape 120 is sandwiched between the front lid 103a and back lid 103b of the lid portion 103 in the front portion thereof. Therefore, the magnetic tape 120 is located at a position adjacent to both of the lids 103a and 103b of the lid portion 103.

The lid portion 103 of the tape cassette 100 for magnetic recording contains a fatty acid as a lubricant to provide an effect of preventing the magnetic tape 120 from being electrified by the lid portion 103.

Further, the lid portion 103 has a function of protecting the magnetic tape 120 against dust and the like.

However, when the characteristics of the magnetic tape 120 are checked after storing the tape cassette 100 for magnetic recording in an environment of high temperature and high humidity for a long period of time, deterioration is observed in the characteristics of the magnetic tape 120 such as still characteristics and recording and reproducing characteristics.

This has been found to be attributable to the fact that the fatty acid contained in the lid portion 103 adversely affects the characteristics of the magnetic tape 120 because the magnetic tape 120 is in a position adjacent to the lid portion 103 as described above.

After active studies into such a situation, the inventor of the present invention found that deterioration of dropout characteristics of a magnetic tape due to changes of properties thereof can be suppressed to a practical level to maintain the durability and smooth traveling of the magnetic tape by controlling the amount of the fatty acid contained in the lid portion 103 as a lubricant such that it stays within a predetermined range.

SUMMARY OF THE INVENTION

A tape cassette for magnetic recording according to the present invention comprises a lid portion made of resin containing 1 to 100 ppm of fatty acid as a lubricant.

According to the invention, since the amount of fatty acid contained as a lubricant in a lid portion made of resin of a tape cassette for magnetic recording is kept equal to or less than 100 ppm, it is possible to reduce adverse effects of the fatty acid on the magnetic tape. As a result, deterioration of dropout characteristics of the magnetic tape due to changes of the properties thereof can be suppressed to a practical level so as to maintain the durability of the magnetic tape.

Further, since the lid portion made of resin contains the fatty acid in an amount of 1 ppm or more, it is possible to prevent the magnetic tape from being electrified, thereby maintaining stable traveling property of the magnetic tape.

Specifically, when a tape cassette for a magnetic tape with a lid portion 103 containing a large amount of the fatty acid as a lubricant is stored in an environment of high temperature and high humidity for a long period of time, the fatty acid is volatilized from the lid portion and tends to stick to the magnetic tape and to react with the metals in the magnetic layer of the magnetic tape. As a result, changes of properties occur in the magnetic tape, which results in deterioration of the dropout characteristics and durability of the same. From such a point of view, the mount of the fatty acid contained in the lid portion is limited to 100 ppm or less to make it possible to reduce adverse effects of the fatty acid on the magnetic tape, to suppress deterioration of the dropout characteristics of the magnetic tape due to changes of properties thereof and to maintain the durability of the magnetic tape.

In a digital VTR for home use or the like for recording a digital image signal, the pitch of the recording track is made as narrow as 10 $\mu$ for the requirement of high density recording placed thereon. As a result, there is a tendency that a low level of deterioration of the characteristics of a magnetic tape which was not a problem in the prior art can now result in more significant effects, which need to be greatly improved.

Meanwhile, the fatty acid in the lid portion of the tape cassette for magnetic recording has an effect of preventing a magnetic tape from being electrified as described above. Therefore, considering the fact that a too small amount of the contained fatty acid can cause a trouble with the traveling of a magnetic tape because the fatty acid does not allow the effect of preventing the electrification of the magnetic tape to be provided at a sufficient level, the amount of the fatty acid contained in the lid portion is made equal to or greater than 1 ppm to allow proper traveling of the magnetic tape.

DETAILED DESCRIPTION OF THE PREFERRED EMBODIMENTS

According to the invention, there is provided a tape cassette for magnetic recording in which the mount of a fatty acid contained in its lid portion made of resin thereof as a lubricant is controlled such that it stays within a range from 1 to 100 ppm in consideration of the fact that when the fatty acid sticks to a magnetic tape as a result of volatilization, it reacts with metals in the magnetic layer of the magnetic tape to adversely affect the characteristics of the magnetic tape and traveling property of the magnetic tape.

An embodiment of the present invention will now be described.

Figure 1:
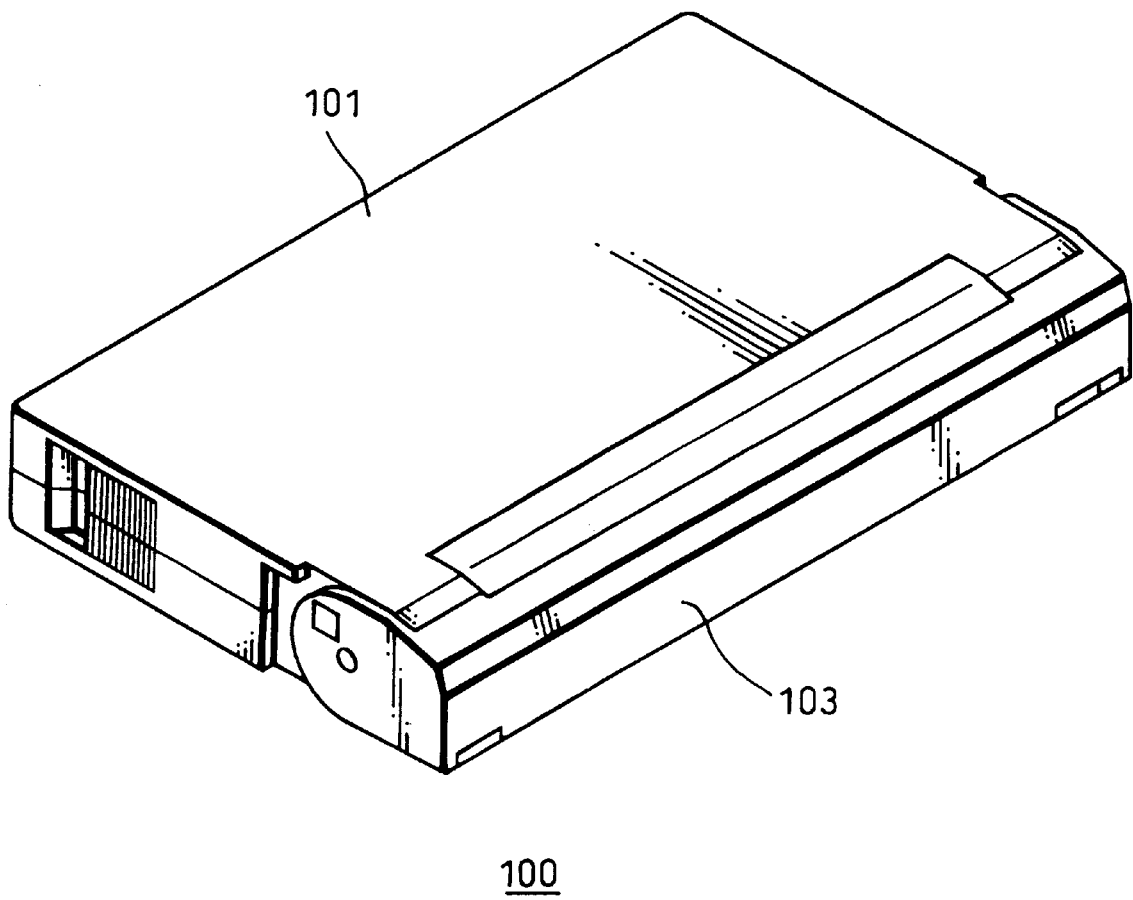
FIG. 1 is a perspective view of a tape cassette for magnetic recording.
Figure 2:
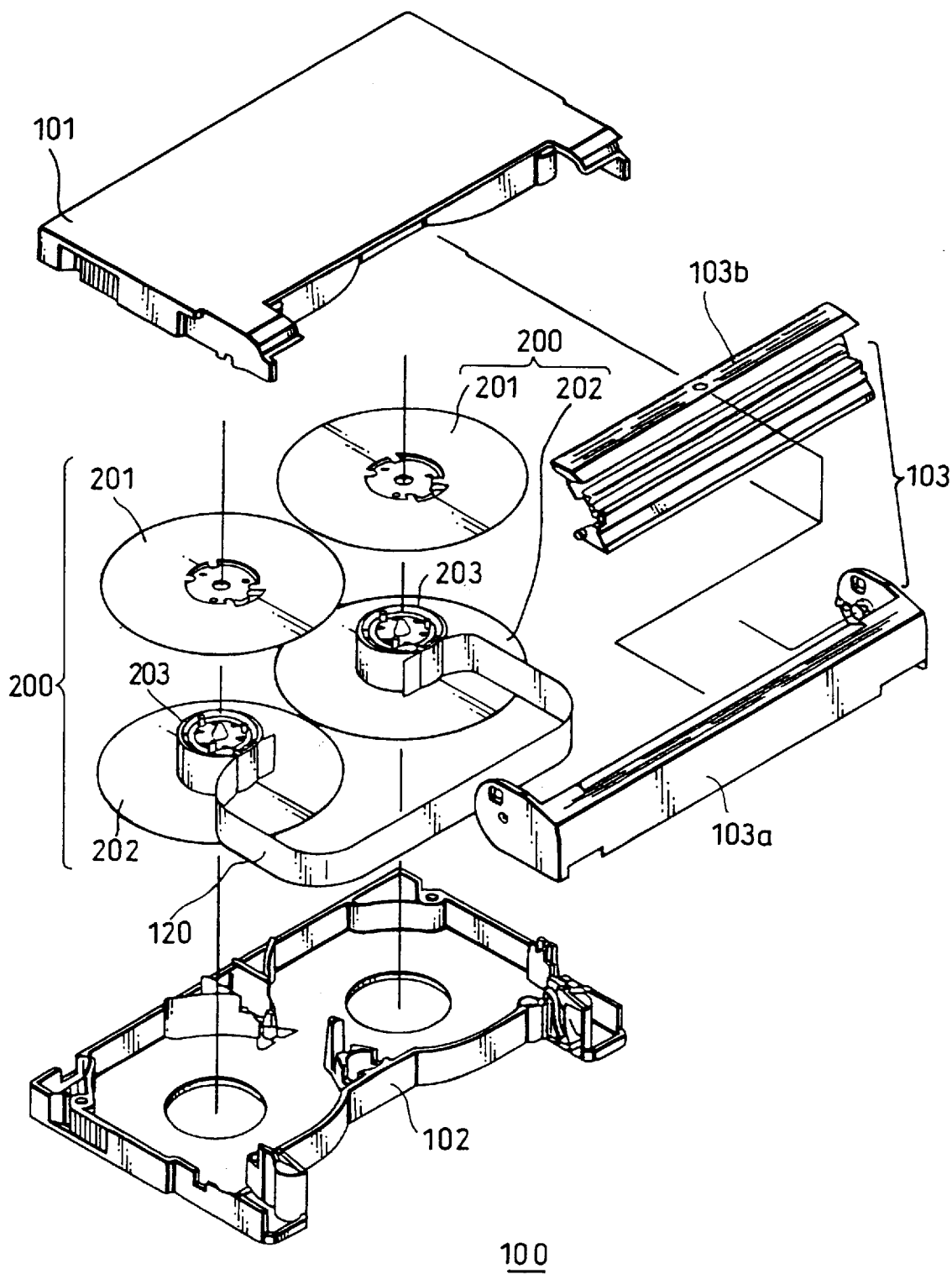
FIG. 2 is an exploded view of the tape cassette for magnetic recording.

The invention may be applied to a tape cassette for magnetic recording having the same structure as that described above with reference to the perspective view and exploded view thereof shown in FIGS. 1 and 2.

Specifically, as shown in FIGS. 1 and 2, the tape cassette 100 for magnetic recording is formed of a upper shell 101 and a lower shell 102 which are combined such that they contain a pair of reels 200 around which a magnetic tape 120 is wound.

In front of both shells 101 and 102, a lid portion 103 is provided to be freely opened and closed which comprises a front lid 103a and a back lid 103b in this embodiment.

For example, the front lid 103a and back lid 103b may be formed using ABS (acrylonitrile-styrene butylene) and is added with a fatty acid as a lubricant.

For example, stearic acid may be used as the fatty acid. However, the fatty acid is not limited thereto.

Each of the reels 200 comprises an upper flange 201, a lower flange 202, and a hub 203 provided at the center portions thereof around which the magnetic tape 120 is wound.

The tape cassette 100 for magnetic recording is configured such that the magnetic tape 120 is sandwiched between the front lid 103a and back lid 103b of the lid portion 103 in the front portion thereof. Therefore, the magnetic tape 120 is disposed at a position adjacent to both of the lids 103a and 103b of the lid portion 103.

Tape cassettes for magnetic recording having lid portions 103 containing different amounts of the fatty acid are prepared by measuring the amounts of the fatty acid contained in the lid portions 103 made of resin of such tape cassettes 100 for magnetic recording as described above to provide 1 through 6 embodiments of the invention and comparative examples 1 and 2.

The amount of the fatty acid contained in the lid portion 103 of the tape cassette 100 for magnetic recording is measured using the method described below.

First, the front lid 103a and back lid 103b of the tape cassette 100 for magnetic recording are crashed and picked up in a weight of 5 g each to obtain a sample powder.

Next, the sample powder is added with 100 ml of acetone and is subjected to extraction for about two hours and, thereafter, the supernatant liquid is taken out using a measuring cylinder of 50 ml and is used as a sample liquid for extraction measurement.

The time period for extraction is not limited to two hours and any duration may be employed as long as it results in sufficient saturation of extraction.

Next, the sample liquid for extraction measurement is subjected to measurement of the amount of the fatty acid in the lid portion using gas the chromatography mass spectrometry (GC-MS).

For example, the DX-303 available from Japan Electric Optics Laboratory Co., Ltd. may be used as the measuring apparatus.

Table 1 below shows the amounts of the fatty acid included in the embodiments 1 through 6 and the comparative examples 1 and 2 measured as described above.

TABLE 1

| samples | amount of fatty acid contained (ppm) |
| --- | --- |
| embodiment 1 | 100 |
| embodiment 2 | 96 |
| embodiment 3 | 50 |
| embodiment 4 | 24 |
| embodiment 5 | 2.2 |
| embodiment 6 | 1.0 |
| comparative example 1 | 110 |
| comparative example 2 | 0.6 |

Table 2 below shows conditions for the fabrication of the magnetic tape. The fabricating conditions for the magnetic tape are common to the 1 through 6 embodiments and the comparative examples 1 and 2.

TABLE 2

| non-magnetic substrate | polyethylene terephthalate (thickness: 6μ, width: 150 mm) |
| --- | --- |
| conditions for deposition | |
| metal magnetic material | 100 weight % of Co |
| incident angle | 45 to 90° |
| amount of oxygen introduced | $3.3 \times 10^6$ m$^3$/sec. |
| degree of vacuum during deposition | $7 \times 10^2$ Pa |
| back coating | 0.5 μm thick coating with mixture of carbon and polycarbonate binder |
| pigment | 100 parts by weight of carbon |
| binder | 100 parts by weight of polycarbonate/polyurethane |
| hardening agent | 10 parts by weight of coronate 1.50 |
| top coat | magnetic surface coated with perfluoropolyether |
| slit width | 8 mm |

A description will now be made on the configuration of a deposition apparatus used for forming the magnetic layer of the magnetic tape.

Figure 3:
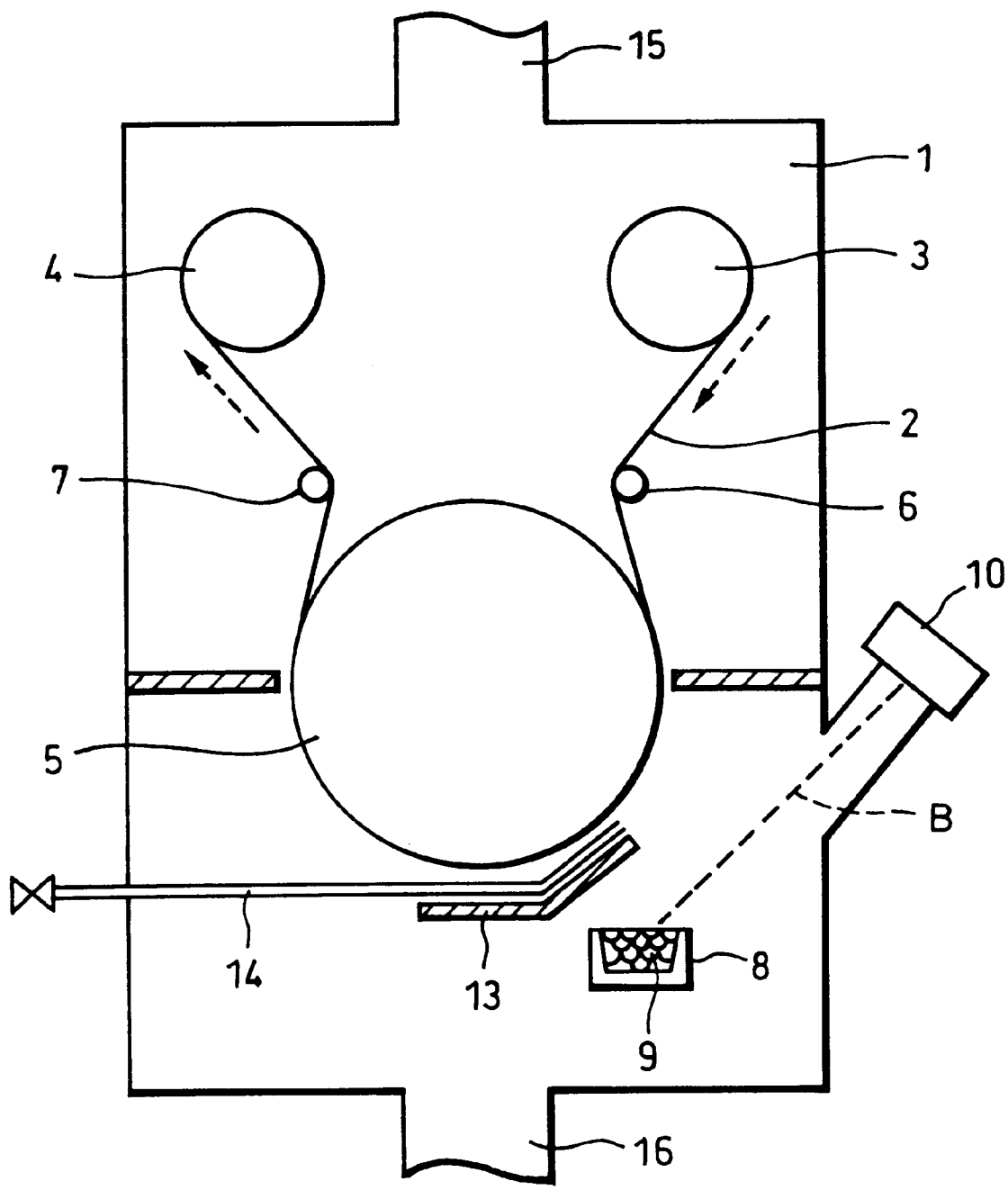
FIG. 3 is a schematic view of a deposition apparatus for a magnetic tape.

Referring to FIG. 3, in this deposition apparatus, a feed roll 3 and a take-up roll 4 are provided in a vacuum chamber 1 which is evacuated through exhaust ports 15 and 16, and a non-magnetic substrate 2 is transported between the feed roll 3 and take-up roll 4 sequentially.

A cooling can 5 is provided on the transport path of the non-magnetic substrate 2 described above from the feed roll 3 to the take-up roll 4. A cooler (not shown) is provided at the cooling can 5 to suppress deformation and the like of the non-magnetic substrate 2 due to temperature rise.

The non-magnetic substrate 2 is fed out from the feed roll 3 sequentially and is taken up by the take-up roll 4 after passing along the circumferential surface of the cooling can 5. Guide rolls 6 and 7 are provided to allow the non-magnetic substrate 2 to travel smoothly.

A crucible 8 is provided under the cooling can 5 in the vacuum chamber 1 and is filled with a metal magnetic material 9. On the other hand, an electron gun 10 is attached to a side wall of the vacuum chamber 1 to heat and vaporize the metal magnetic material 9 filled in the crucible 8. The electron gun 10 is positioned such that the metal magnetic material 9 in the crucible 8 described above is irradiated by an electron beam B emitted therefrom. The non-magnetic substrate 2 is coated by the metal magnetic material 9 vaporized as a result of irradiation with the electron beam B to form a magnetic layer thereon.

A shutter 13 is provided in the vicinity of the cooling can 5 between the cooling can 5 and the crucible 8 such that it covers a predetermined region of the non-magnetic substrate 2 that travels along the circumferential surface of the cooling can 5, and the shutter 13 causes the vaporized metal magnetic material 9 to be deposited on the non-magnetic substrate 2 at an angle within a predetermined range.

During the deposition of the magnetic layer, oxygen gas is supplied to the surface of the non-magnetic substrate 2 to improve magnetic characteristics, durability and weather resistance from an oxygen gas intake pipe 14 provided so as to penetrate through a side wall of the vacuum chamber 1.

The still characteristics were measured in terms of the time (in minutes) during which a recorded signal was deteriorated from the initial state by −3 dB.

The measurement of the dropouts and still characteristics were carried out using a machine obtained by modifying a Model EVS-900 manufactured by Sony Corporation. The recorded signal used included 50% white.

Table 3 below shows the results of the measurement on the dropout increasing rates and still characteristics of the embodiments 1 through 6 and the comparative examples 1 and 2.

TABLE 3

|  | fatty acid contained in lid portion (ppm) | before storage | | after storage for four days at 45° C. and 80% | | electrical resistance ($\Omega$) |
| --- | --- | --- | --- | --- | --- | --- |
|  |  | still characteristics (min.) | dropout increasing rate (%) | still characteristics (min.) | dropout increasing rate (%) |  |
| embodiment 1 | 100 | $\geq$120 | — | $\geq$120 | +100 | $1 \times 10^{11}$ |
| embodiment 2 | 96 | $\geq$120 | — | $\geq$120 | +60 | $1 \times 10^{12}$ |
| embodiment 3 | 50 | $\geq$120 | — | $\geq$120 | +20 | $2 \times 10^{13}$ |
| embodiment 4 | 24 | $\geq$120 | — | $\geq$120 | +25 | $6 \times 10^{13}$ |
| embodiment 5 | 2.2 | $\geq$120 | — | $\geq$120 | +20 | $8 \times 10^{14}$ |
| embodiment 6 | 1.0 | $\geq$120 | — | $\geq$120 | +10 | $1 \times 10^{15}$ |
| comparative example 1 | 110 | $\geq$120 | — | 44 | $\geq$+1000 | $5 \times 10^{10}$ |
| comparative example 2 | 0.6 | unmeasurable due to high electrical resistance and occurrence of jamming during measurement | | | | $5 \times 10^{16}$ |

The thickness of the magnetic layer of the magnetic tape is set to 200 nm, and perfluoropolyether is applied to the surface of the magnetic layer as a lubricant to finally complete the magnetic tape 120 of the tape cassette 100 for magnetic recording shown in FIGS. 1 and 2.

Measurement was made on the still characteristics and the dropout increasing rates of the tape cassettes for magnetic recording as the embodiments 1 through 6 and the comparative examples 1 and 2 fabricated as described above before and after storage in an environment of high temperature and high humidity.

They were stored at an air temperature of 45° C. and a humidity of 80% for four days.

Measurement was made on the dropout increasing rates and still characteristics of the magnetic tapes 120 in the vicinity of the lid portions 103 of the tape cassettes 100 for magnetic recording as shown in FIGS. 1 and 2 after they were stored under the conditions described above.

Dropouts resulting in attenuation of reproduction output by −10 dB or more and resulting in loss of signals having a duration of 10 μsec or more were detected to obtain the increasing rate (%) before and after the storage under high temperature and high humidity environment.

In Table 3 shown above, the lid portions of the tape cassettes for magnetic recording of the embodiments 1 through 6 contain the fatty acid in an amount in the range from 1 to 100 ppm. All of the magnetic tapes exhibit preferable still characteristics of 120 (minutes) or more before and after the storage under high temperature and high humidity environment of the conditions described above, which indicates that there is little deterioration.

Referring to the dropout increasing rates (%) of the embodiments 1 through 6, it is apparent that they are suppressed to relatively low values in the range from 10 to 100%.

In the comparative example 1, the lid portion of the tape cassette for magnetic recording contains the fatty acid in an amount exceeding 100 ppm. It is apparent that in this case, the still characteristics are significantly deteriorated and the dropout increasing rate is extremely high.

It is apparent from FIG. 3 that the greater the amount of the fatty acid contained in the lid portion 103 of the tape cassette 100 for magnetic recording, the lower the electrical resistance ($\Omega$). This indicates that the fatty acid has an effect of preventing the electrification.

In the comparative example 2, the lid portion 103 of the tape cassette 100 for magnetic recording contains the fatty acid in an amount less than 1 ppm. In this case, the magnetic tape 120 was caught in the lid portion 103 of the tape cassette for magnetic recording, i.e., jamming occurred, and it was not possible to measure the still characteristics and the dropout increasing rate of the magnetic tape.

The reason was that because excessive electrical resistance was developed in the magnetic tape since the amount of the fatty acid contained in the lid portion 103 of the tape cassette 100 for magnetic recording was too small, and this disallowed the electrification preventing effect to be sufficiently demonstrated.

It is apparent from the above description that the amount of the fatty acid included in the lid portion 103 of the tape cassette 100 for magnetic recording in the excess of 100 ppm results in changes of properties of the magnetic tape in the vicinity of the lid portion 103 after the tape for magnetic recording is stored for a long period of time in the above-described environment of high temperature and high humidity to deteriorate the dropout characteristics and durability of the magnetic tape.

If the amount of the fatty acid contained in the lid portion 103 of the tape cassette 100 for magnetic recording is less than 1 ppm, a sufficient electrification preventing effect can not be achieved, which results in a trouble with the traveling property of the magnetic tape 120.

That is, it is apparent from the results shown in Table 3 that in order to prevent the magnetic tape 120 from being electrified and to maintain stable traveling property of the magnetic tape 120, the amount of the fatty acid contained in the lid portion 103 of the tape cassette 100 for magnetic recording must be kept within the range from 1 to 100 ppm.

Although the above-described embodiments have referred to the tape cassette for magnetic recording having the front lid and the back lid made of resin, the present invention is not limited to the tape cassette for magnetic recording having such a configuration and equally applies to a tape cassette for magnetic recording having only a front lid made of resin.

Further, although stearic acid was used as the fatty acid contained in the front and back lids in the above-described examples, the present invention is not limited to such examples and other fatty acids available in the market such as palmitic acid, oleic acid, myristic acid, linolenic acid, linoleic acid, lauric acid, capric acid or the like and combinations thereof may be used to provide a similar effect.

When a mixture of plural kinds of fatty acids is used, the total amount of the fatty acids in the lid portion of the tape cassette for magnetic recording is measured to limit the same within the range from 1 to 100 ppm.

As the means for forming the magnetic layer, known methods in the prior art may be used including a vacuum deposition method wherein a ferromagnetic metal material is heated and vaporized in vacuum to deposit it on a non-magnetic substrate, an ion plating method wherein the vaporization of a ferromagnetic metal material is carried out in discharges, a sputtering method wherein atoms on the surface of a target are sputtered by argon ions produced by glow discharges in an atmosphere mainly composed of argon and so on.

While Co is used for the magnetic layer in the above-described embodiments the magnetic layer of, the magnetic tape 120 in the tape cassette for magnetic recording according to the present invention is not limited to such embodiment, and it is possible to use ferromagnetic metals such as Fe and Ni and ferromagnetic alloys such as Co—Ni, Co—Fe—Ni, Fe—Cu, Co—Cu, Co—Au, Co—Pt, Mn—Al, Fe—Cr, Co—Cr, Ni—Cr, Fe—Co—Cr, Fe—Co—Cr—Ni and so on. Either a single-layer film or a multi-layer film made of such materials may be used. Further, a backing layer or an intermediate layer may be provided between the non-magnetic substrate and the metal magnetic thin film or between layers in the case of a multi-layer film for purposes such as improving adhesion between the layers and controlling the magnetic coercive force or the like.

Furthermore, for example, an oxide may be allowed in order to improve corrosion resistance in the vicinity of the surface of the magnetic layer.

A protective film layer may be formed on the magnetic layer. The material for this layer may be any material which is commonly used for a protective film for a normal metal magnetic thin film. By way of example, it is possible to use carbon, $CrO_2$, $Al_2O_3$, BN, oxides of Co, MgO, $SiO_2$, $Si_3O_4$, $SiN_x$, SiC, $SiN_x$—$SiO_2$, $ZrO_2$, $TiO_2$ and TiC and the like. A single-layer film or a composite film made of such materials may be used.

Referring to the non-magnetic substrate, any material may be used as long as it is conventionally known. For example, it is possible to use polyesters such as polyethylene terephthalate or the like, polyorefines such as polypropylene or the like, cellulose derivative such as cellulose triacetate, cellulose diacetate, cellulose acetate butyrate or the like, vinyl type resin such as polyvinyl chloride, polyvinylidene chloride or the like, plastic such as polycarbonate, polyimide, polyamide-imide and the like, paper, metals such as aluminum, copper or the like, light alloys such as aluminum alloys titanium alloys or the like ceramics monocrystalline silicon, and so on.

As described above, according to the present invention, the amount of a fatty acid added as a lubricant in a lid portion of a tape cassette for magnetic recording having the lid portion made of resin is limited in the range from 1 to 100 ppm.

According to the invention, since the amount of a fatty acid contained as a lubricant in a lid portion of a tape cassette for magnetic recording having the lid portion made of resin is limited to 100 ppm or less, it is possible to reduce adverse affects of the fatty acid on a magnetic tape. As a result, deterioration of dropout characteristics due to changes of properties of the magnetic tape can be reduced to a practical level, and the durability of the magnetic tape can be maintained.

Further, since the amount of the fatty acid contained in the lid portion is 1 ppm or more, it is possible to prevent a magnetic tape from being electrified. This makes it possible to maintain stable traveling property of the magnetic tape.

According to the invention, since the amount of the fatty acid contained in the lid portion of the tape cassette for magnetic recording having the lid portion made of resin is limited to 100 ppm or less, it is possible to reduce adverse affects of the fatty acid on a magnetic tape. As a result, deterioration of dropout characteristics due to changes of properties of the magnetic tape can be reduced to a practical level, and the durability of the magnetic tape can be maintained.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tape cassette having a magnetic tape for magnetic recording comprising:

a lid portion made of resin containing a fatty acid in an amount in the range from 1 to less than 100 ppm by weight, wherein said lid portion is in contact with said magnetic tape.

2. The tape cassette having a magnetic tape for magnetic recording according to claim 1, wherein said lid portion made of resin comprises a front lid and a back lid and said magnetic tape is sandwiched therebetween.

3. The tape cassette having a magnetic tape for magnetic recording according to claim 1, wherein said lid portion made of resin comprises only a front lid.

4. The tape cassette having a magnetic tape according to claim 1, wherein said fatty acid is selected from the group consisting of stearic acid, palmitic acid, oleic acid, myristic acid, linolenic acid, linoleic acid, lauric acid, and capric acid.

* * * * *